United States Patent [19]

Fuller et al.

[11] 3,881,943
[45] May 6, 1975

[54] COMPOSITION FOR INHIBITING LEAKAGE OF AIR PRESSURE FROM PNEUMATIC TIRES AND THE LIKE

[76] Inventors: John C. Fuller, 5221 S.E. Naef Rd., Milwaukie, Oreg. 97222; Gordon W. Fuller, 7320 S.W. Landeau St., Portland; Ralph A. Fuller, 12220 S.W. Grant, Tigard, both of Oreg. 97223; William I. Fuller, P.O. Box 123, Wilsonville, Oreg. 97070

[22] Filed: Sept. 13, 1973

[21] Appl. No.: 396,748

[52] U.S. Cl. ............... 106/33; 117/95; 152/347; 156/115; 252/72
[51] Int. Cl. ....... B60c 5/14; B60c 21/08; C09k 3/10
[58] Field of Search ......... 106/33; 252/72; 152/347; 161/405; 156/115; 117/95

[56] References Cited
UNITED STATES PATENTS

| | | | |
|---|---|---|---|
| 2,129,459 | 9/1938 | Benoit | 106/33 |
| 2,316,140 | 4/1943 | Skeen | 106/33 |
| 3,449,155 | 6/1969 | Fuller | 106/33 |

Primary Examiner—Allan Lieberman
Attorney, Agent, or Firm—Oliver D. Olson

[57] ABSTRACT

The leakage of air pressure from pneumatic tire assemblies and the like is inhibited by introducing into the air space thereof an aqueous solution of sodium benzoate in concentration of at least about 2% by weight. The amount of solution introduced into the air space must be sufficient to maintain the inner surface defining the air space wet with the solution. By increasing this amount of solution for pneumatic tires by a factor of up to about 2, a significant reduction in operating temperature of the tires is achieved. With pneumatic tires mounted on steel wheels, from about 0.25% to about 1.0% by weight of sodium nitrite is added to the solution to inhibit rusting. When the wheels contain aluminum, cadmium, zinc and/or lead, from about 0.25% to about 1.0% by weight of sodium chromate is added to the solution to inhibit corrosion. To prevent freezing of the solution at low temperatures of use, up to about 20% of weight of ethylene glycol is added to the solution.

6 Claims, No Drawings

«3,881,943»

COMPOSITION FOR INHIBITING LEAKAGE OF AIR PRESSURE FROM PNEUMATIC TIRES AND THE LIKE

BACKGROUND OF THE INVENTION

This invention relates to sealant compositions, and more particularly to a composition for inhibiting the leakage of the air pressure from pneumatic tire assemblies and the like.

This invention has particular utility in inhibiting the loss of air pressure from pneumatic tire assemblies. These are classified generally as tube-type in which a casing confines an inner tube filled with air under pressure, and tubeless in which a lined casing is sealed to a metal wheel rim with the casing and rim defining the space filled with air under pressure. This invention is operable for both types of tire assemblies, whether of natural or synthetic rubber.

Gradual loss of air pressure on tube-type tire assemblies may occur by seepage through the inner tube because of the permability of the rubber, or because of small openings therein. Similar loss of air pressure in tubeless assemblies may occur by seepage through the liner and casing. Such loss of air pressure results in cord fatigue and other deterioration due to excessive flexing and heat.

A critical problem in tubeless tire servicing is the frequent damage to the bead area during mounting and demounting. The tubeless liner seal is frequently violated by tire-changing apparatus, and since this often occurs during the final mounting on the wheel rim, it cannot readily be detected. This type of damage is commonly recognized in the industry as a major cause of air leakage into the tire cord structure, with consequent separation of the tire body, serious air pressure loss from the air chamber and/or oxidation of the tire structure.

Ply separation in tubeless tires results from seepage of air pressure outwardly through the tire. Such separation occurs between any of the plies in new, as well as recapped tires and most frequently occurs in the top ply area in recapped tires. It is generally recognized in the retreading art that the incidence of such separation ranges upwardly to about 15% of the total production of recapped tires.

Air pressure in the inflation chamber of the tire is a load supporting factor and the maintenance of this pressure determines the load range of the tire. Accordingly, the loss of air pressure in the chamber results in under-inflation and consequent overloading of the tire. Underinflation by 5% to 10% of normal pressure causes critical heat problems, particularly in tires having a large number of plies, for example 18 to 36 or more plies.

Thus, with tires which are incapable of maintaining air pressure, frequent additions of air pressure are required. Each addition of air pressure introduces fresh oxygen into the inflation chamber and thence into the structure of the tire, resulting in oxidation and other deleterious effects which adversely effect tensile strength and retread potential. These adverse effects are further accelerated by increased heat due to intermittent operation at under-inflation pressures.

Various types of compositions have been proposed heretofore for inhibiting the loss of air pressure from pneumatic tire assemblies. In general, however, certain inherent deficiencies in these compositions have rendered them less than completely satisfactory. For example, some tend to cause unbalancing of the mounted tire assemblies, either because of the consistency of the composition, or because of the excessive quantity required for effective sealing. Some cause swelling, or softening, or otherwise adversely affect the cord structure and/or the rubber of the tire assembly. Some harden, or cake, within the tire assembly with consequent loss of sealing quality after relatively short periods of time. Some are of a paste-like or highly viscous consistency, rendering them difficult to introduce into the interior space of the tire assembly. Some cause complete stoppage of the valve stem, rendering the latter useless for later deflation of the tire for demounting. In this regard, such stoppage has occasionally required that the tire be punctured in order to remove sufficient air pressure to facilitate demounting of the tire from the wheel, thus inflicting needless damage to an otherwise sound casing. Some are not usable with tubeless tire assemblies because of their corrosive effect on the metal wheel rim.

My earlier U.S. Pat. No. 3,449,155, discloses air leakage sealing compositions which overcome the aforementioned deficiencies. However, my earlier compositions also are not completely satisfactory, primarily because of the difficulty, economically, in obtaining consistently reproducible and maintainable composition properties. Thus, over a period of extended use and in varying conditions of temperature and with tire wheels of diverse metals and alloys, the sealing capability and the corrosion inhibiting quality of the compositions vary inconsistently. Further, the compositions tend to remove protective paints frequently applied to the air chamber surface of tire wheels, exposing the underlying metal to further corrosion. Still further, such compositions produce a disagreeable odor when contacted with the skin, as necessitated during mounting and demounting of the tire.

SUMMARY OF THE INVENTION

In its basic concept, this invention involves the inhibition of leakage of air pressure from pneumatic tires and the like by maintaining wet the inner surface defining the air space thereof with an aqueous solution of at least one of the alkali metal salts of benzoic acid, in concentration of at least about 2% by weight.

It is by virtue of the foregoing basic concept that the principal objective of this invention is achieved; namely, to overcome the aforementioned deficiencies of prior methods and compositions.

The foregoing and other objects and advantages of this invention will appear from the following detailed description of preferred embodiments.

DESCRIPTION OF THE PREFERRED EMBODIMENTS

The sealant composition of this invention consists essentially of an aqueous solution of at least one of the alkali metal salts of benzoic acid. At least about 2% by weight of the material in water is required to provide an effective sealant against the gradual loss of air pressure from pneumatic tires and the like. Between about 5% and 10% by weight of the material is preferred for general applications, although up to about 25% by weight may be utilized in special circumstances. Concentrations above about 10% generally afford no greater sealant property, and hence are economically wasteful.

Of the above identified benzoic acid salts suitable for the compositions of this invention, sodium benzoate is preferred for its low cost, commercial availability, chemical stability and ample solubility in water.

When the aforementioned aqueous solution is employed in tubeless tire assemblies, it is desirable to include one or more corrosion inhibitors to minimize corrosion of the metal wheel rim. It has been found that for wheel rims made of steel, effective corrosion inhibition is only achieved by incorporating in the composition about 0.25% to about 1.0%, preferably about 0.75%, of at least one of the nitrites of the alkali metals. Sodium nitrite is preferred for its economy and availability. When the composition or surface coating of the wheel rim includes aluminum, cadmium, zinc and/or lead, effective corrosion inhibition is afforded by supplementing the nitrite in the composition with from about 0.25% to about 1.0%, preferably about 0.75% of at least one of the chromates of the alkali metals. Sodium chromate is preferred for its economy and availability.

The preferred composition for pneumatic tire assemblies includes both of the above classes of corrosion inhibitors in substantially equal percentages by weight. In particular, the preferred composition includes about 0.75% by weight sodium nitrite and about 0.75% by weight sodium chromate.

When the composition is utilized in pneumatic tires and the like which are subjected to low temperatures, the aqueous solution may incorporate up to about 20% by weight of ethylene glycol, to prevent freezing.

The amount of aqueous solution required for effectively inhibiting seepage losses of air pressure in tire assemblies is chosen to protect the tire throughout its tread life and to provide sufficient liquid to maintain the integrity of the liner seal in tubeless tires, allowing for some loss as bead sealing areas are repeatedly opened and sealed off. This amount of solution varies with the sizes of tires. For example, passenger car tires ranging upward in size to 845 × 15 require about 2 oz. each; those in the size range of 800 × 16.5 require about 6 oz. each; those in the size range of 11–22.5 require about 12 oz. each; those in the size range of about 1800 × 22.5 require about 2 qts each; those in the size range of 2700 × 49 require about 2 gals. each; those in the size range of 4000 × 57 require about 5 gals. each, and so on.

It has been found that a significant reduction in operating temperature of vehicle tires is achieved by increasing the amount of solution in the tire by a factor of up to about 2. For example, an average temperature reduction of about 30°F. is achieved when about 4 oz. of solution is used in passenger car tires ranging upward in size to 845 × 15; when 8 oz. of solution is used in tires in the size range of 800 × 16.5; when 16 oz. of solution is used in tires of the size range of 11–22.5; when 3 qts. of solution are used in the tire size range of 1800 × 22.5; when 7 gals. of solution are used in the tire size range of 4000 × 57, and so on.

The following examples are illustrative of the compositions of this invention:

A solution of 5 parts by weight of commercial sodium benzoate and 96 parts by weight of water was prepared. 2 oz. quantities of this solution were introduced into a number of damaged standard passenger tire assemblies, both of the tube and tubeless types, through the valve stem without removal of the valve core, by use of special injection equipment. After introduction, each tire assembly was rotated to distribute the solution over the entire inner surface of the tire.

Before such treatment, the damaged tire assemblies had been observed to go completely flat within 2 to 8 hours. After introduction of the above identified sealant composition, no measurable loss of air pressure occurred over a driving time of more than one month. Several batches of the foregoing solution were prepared from different batches of commercially available sodium benzoate. The solutions consistently had substantially the same pH, and the pH remained substantially constant over extended periods of use in a wide range of tire sizes, and provided substantially the same sealant quality.

Rust inhibitors were added to the above identified aqueous solution of sodium benzoate to inhibit the rusting of the wheel rims on which tubeless tires were mounted. With wheel rims made of steel, it was found that effective corrosion inhibition was obtained only when one or more alkali metal nitrites, preferably sodium nitrite, was included in the solution, in concentration ranging from about 0.25% to about 1.0%, preferably about 0.75%. A variety of various other well known corrosion inhibitors were tested, but were found to be unsatisfactory.

With wheel rims including aluminum, cadmium, zinc and/or lead in their composition, or as a surface coating, effective corrosion inhibition was found to be obtainable only when one or more alkali metal chromates, preferably sodium chromate, was included with the nitrite in the aqueous solution, in concentration ranging from about 0.25% to about 1.0% by weight, preferably about 0.75% by weight. Various other well known corrosion inhibitors were tested, in substitution of the chromate, but were found to be less effective.

The use of either or both of the classes of the corrosion inhibitors identified hereinbefore in the aqueous solution of sodium benzoate, was found to have no adverse effect on the sealant quality of the composition. Similarly, the inclusion of up to 20% by weight of ethylene glycol has no adverse effect on the sealing or corrosion inhibiting capability of the composition, while preventing freezing of the solution when subjected to temperatures ranging downward to minus 60° F.

All of the foregoing solutions provide effective sealing of tires with no noticeable adverse effect on the rubber of the tires. The low viscosity of the solution enables them to be introduced into the tire casing assembly, either through the unobstructed valve stem, after removal of the valve core, or by injection through the valve stem, without removal of the core, by use of special injection equipment. This latter procedure affords the significant advantage of not having to deflate the tire before introducing the solution. The low viscosity of the solution also facilitates the uniform distribution of the solutions over the inner surface of the tires and wheels. The solutions do not harden, but rather remain fluid over extended periods of usage in the tires, providing long service life.

Although this invention has particular utility in inhibiting loss of air pressure in pneumatic tire assemblies, it is also effective in preventing the loss of air pressure in other structures, such as basketballs, footballs and other similar objects.

It will be apparent to those skilled in the art that various changes may be made in the numbers and proportions of ingredients described hereinbefore without departing from the spirit of this invention.

Having now described our invention and the manner in which it may be used, we claim:

1. A composition for inhibiting the leakage of air pressure from pneumatic tire assemblies and the like, comprising an aqueous solution consisting essentially of about 2% to about 25% by weight of at least one of the alkali metal salts of benzoic acid.

2. The composition of claim 1 wherein the material is sodium benzoate.

3. The composition of claim 1 wherein the aqueous solution consists essentially of about 5% to about 10% by weight sodium benzoate.

4. The composition of claim 1 including from about 0.25% to about 1.0% by weight of at least one of the alkali metal nitrites.

5. The composition of claim 1 including from about 0.25% to about 1.0% by weight of at least one of the alkali metal nitrites and from about 0.25% to about 1.0% by weight of at least one of the alkali metal chromates.

6. The composition of claim 1 including about 0.75% by weight sodium nitrite and about 0.75% by weight sodium chromate.

* * * * *